(12) United States Patent
Marshall

(10) Patent No.: US 9,681,408 B2
(45) Date of Patent: Jun. 13, 2017

(54) DETERMINING CLOCK-DRIFT USING SIGNALS OF OPPORTUNITY

(71) Applicant: u-blox AG, Thalwil (CH)

(72) Inventor: Christopher Brian Marshall, Reigate (GB)

(73) Assignee: U-BLOX AG, Thalwil (CH)

( * ) Notice: Subject to any disclaimer, the term of this patent is extended or adjusted under 35 U.S.C. 154(b) by 106 days.

(21) Appl. No.: 14/700,086

(22) Filed: Apr. 29, 2015

(65) Prior Publication Data
US 2015/0319725 A1 Nov. 5, 2015

(30) Foreign Application Priority Data

Apr. 30, 2014 (EP) .................................. 14166683

(51) Int. Cl.
| | |
|---|---|
| *H04J 3/16* | (2006.01) |
| *H04W 56/00* | (2009.01) |
| *G01S 19/42* | (2010.01) |
| *G01S 5/02* | (2010.01) |
| *G04R 40/06* | (2013.01) |
| *G01S 19/23* | (2010.01) |
| *G01S 19/24* | (2010.01) |

(52) U.S. Cl.
CPC .......... *H04W 56/0015* (2013.01); *G01S 5/02* (2013.01); *G01S 19/23* (2013.01); *G01S 19/42* (2013.01); *G04R 40/06* (2013.01); *G01S 19/246* (2013.01)

(58) Field of Classification Search
None
See application file for complete search history.

(56) References Cited

U.S. PATENT DOCUMENTS

| | | | |
|---|---|---|---|
| 5,502,450 | A | 3/1996 | Zablotney et al. |
| 6,492,945 | B2 | 12/2002 | Counselman, III et al. |
| 6,658,258 | B1 | 12/2003 | Chen et al. |
| 6,978,124 | B2 | 12/2005 | Benes et al. |

(Continued)

FOREIGN PATENT DOCUMENTS

| | | |
|---|---|---|
| EP | 0 437 822 A2 | 7/1991 |
| EP | 0 843 179 A1 | 5/1998 |

(Continued)

OTHER PUBLICATIONS

Thomas Locher, et al., Received-Signal-Strength-Based Logical Positioning Resilient to Signal Fluctuation, 2005, IEEE Computer Society, Washington, DC, USA.

(Continued)

*Primary Examiner* — Steven H Nguyen
(74) *Attorney, Agent, or Firm* — Blakely Sokoloff Taylor & Zafman LLP

(57) ABSTRACT

A method and apparatus for determining a drift between a local clock of a movable device and a reference clock that is used by one or more reference devices. The local clock may be calibrated at a calibration location and then the movable device may be moved to an operating location that is different from the calibration location. The drift is determined by observing one or more signals transmitted by the respective one or more reference devices, when the device is at the calibration location and when it is at the operating location. These observations are used together with a model of the signals to determine the drift.

17 Claims, 5 Drawing Sheets

(56) References Cited

U.S. PATENT DOCUMENTS

| | | | |
|---|---|---|---|
| 7,598,911 | B2 | 10/2009 | Marinier |
| 7,831,341 | B2 | 11/2010 | Sheikh |
| 8,018,383 | B1 | 9/2011 | Schantz et al. |
| 8,050,687 | B2 | 11/2011 | Duffett-Smith et al. |
| 8,063,825 | B1 * | 11/2011 | Yang .................. G01S 5/0072 342/458 |
| 8,072,383 | B1 | 12/2011 | Martin et al. |
| 9,046,591 | B1 * | 6/2015 | Yang ..................... G01S 3/00 |
| 2007/0066231 | A1 | 3/2007 | Duffett-Smith et al. |
| 2008/0100502 | A1 | 5/2008 | Jantunen et al. |
| 2009/0117928 | A1 | 5/2009 | Ladd et al. |
| 2009/0131076 | A1 | 5/2009 | Moeglein et al. |
| 2010/0302102 | A1 | 12/2010 | Desai et al. |
| 2010/0309048 | A1 | 12/2010 | Polisetty et al. |
| 2010/0311440 | A1 | 12/2010 | Rakanovic et al. |
| 2011/0140966 | A1 | 6/2011 | Ferreol et al. |
| 2012/0081248 | A1 * | 4/2012 | Kennedy ............... G01S 5/0242 342/118 |
| 2013/0051434 | A1 * | 2/2013 | Draganov ............... G01S 19/22 375/148 |
| 2013/0229303 | A1 * | 9/2013 | Marshall .................. G01S 5/00 342/357.29 |
| 2013/0265193 | A1 * | 10/2013 | Kennedy ................ G01S 19/46 342/357.29 |
| 2015/0048972 | A1 * | 2/2015 | Kennedy ................ G01S 19/46 342/357.29 |
| 2016/0014713 | A1 * | 1/2016 | Kennedy ............... G01S 5/0242 455/456.1 |

FOREIGN PATENT DOCUMENTS

| | | |
|---|---|---|
| EP | 1 229 344 A1 | 8/2002 |
| EP | 2327994 | 6/2011 |
| EP | 2 634 593 A1 | 9/2013 |
| WO | WO 2006/042810 A1 | 4/2006 |
| WO | WO 2008/085532 | 7/2008 |
| WO | WO 2011/042726 | 4/2011 |
| WO | WO 2011/146011 | 11/2011 |
| WO | WO 2011/149781 | 12/2011 |

OTHER PUBLICATIONS

Thomas Callaghan, et al., Correlation-Based Radio Localization in an Indoor Environment, EURASIP Journal on Wireless Communications and Networking, 2011, http://jwcn.eurasipjournals.com/content/2011/1/135.

Michael Robinson, et al., Topological Localization via Signals of Opportunity, IEEE Transactions on Signal Processing, May 2012.

Chen Sun, et al., Direction of Arrival Estimation Based on a Single Port Smart Antenna Using MUSIC Algorithm with Periodic Signals, World Academy of Science, Engineering and Technology 11, 2005.

Tolga Eren, Using Angle of Arrival (Bearing) Information for Localization in Robot Networks, Turk J Elec Engin, vol. 15, No. 2, 2007.

Bryan N. Hood, et al., Estimating DoA From Radio-Frequency RSSI Measurements Using an Actuated Reflector, IEEE Sensors Journal, vol. 11, No. 2, Feb. 2011.

Dragos Niculescu, et al., Ad Hoc Positioning System (APS) Using AOA, IEEE Infocom 2003.

D. Palmer, et al., Non-GNSS Radio Positioning Using the Digital Audio Broadcasting (DAB) Signal, Proceedings of the 22nd International Technical Meeting of the Satellite Division of the Institute of Navigation (ION GNSS 2009), Savannah, GA, USA, Sep. 2009.

Michael B. Matthews, et al., SCP Enabled Navigation Using Signals of Opportunity in GPS Obstructed Environments, Navigation: Journal of the Institute of Navigation, Summer 2011, vol. 58, No. 2, pp. 91-110.

Damien Serant, et al., The Digital TV Case—Positioning Using Signals-of-Opportunity Based on OFDM Modulation, InsideGNSS, Nov./Dec. 2011.

Manh Hung V. Le, et al., Indoor Navigation System for Handheld Devices, Oct. 22, 2009.

Maniesh Kulshrestha, Locations; Because Life Moves Adding Location to Intelligence, Presented to Geointelligence Conference, Jul. 27-28, 2009, Presentation slides retrieved from: http://www.gisdevelopment.net/proceedings/Geointelligence/2009/geoint09_ManieshKulshrestha.pps.

European Search Report dated Nov. 10, 2014 (14166683.4-1812 (7 pages).

Miller, M. M. et al., "Navigating in Difficult Environments: Alternatives to GPS—2," Low-Cost Navigation Sensors and Integration Technology, Sensors and Electronics Technology Panel (SET), RTO-EN-SET-116(2009), pp. 1-18, Mar. 2009.

Raquet, J., et al., "Non-GNSS Radio Frequency Navigation," IEEE International Conference on Acoustics, Speech and Signal Processing, Piscataway, New Jersey, Mar. 31, 2008, pp. 5308-5311, XP031251800.

Rong Peng, et al., Angle of Arrival Localization for Wireless Sensor Networks, IEEE Secon 2006.

Abbas H. Kazmi, Te Al., Effect of Scattering around BS on the Spatial Statistics of Mobile Channel in Macrocell Environment, 2010.

Ali Abdi, et al., A Parametric Model for the Distribution of the Angle of Arrival and the Associated Correlatio Function and Poer Spectrum at the Mobile Station, IEEE Transactions on Vehicular Technology, vol. 51, No. 3, May 2002.

Panarat Cherntanomwong, et al., Signal Subspace Interpolation from Discrete Measurement Samples in Constructing a Database for Location Fingerprint Technique, IEICE Trans. Commun., vol. E92-B, No. 9, Sep. 2009.

Richard K. Martin, et al., Bandwidth Efficient Cooperative TDOA Computaqtion for Multicarrier Signals of Opportunity, IEEE Transactions on Signal Processing, vol. 57, No. 6, Jun. 2009.

Ofer Bar-Shalom, et al., Direct Position Determination of OFDM Signals, 2007 IEEE.

Dr. Chun Yang, et al., Self-Calibrating Position Location Using Signals of Opportunity, 22nd International Meeting of the Satellite Division of the Institute of Navigation, Savannah, GA, Sep. 22-25, 2009.

Michael Robinson, et al, Topological Localization via Signals of Opportunity, IEEE Tansactions on Signal Processing, Feb. 2012.

\* cited by examiner

DETERMINING CLOCK-DRIFT USING SIGNALS OF OPPORTUNITY

FIELD OF THE INVENTION

This invention relates to a method and apparatus for determining (or helping to determine) a drift between a local clock of a movable device and a reference clock remote from the movable device. It relates, in particular, to a method and apparatus for determining this clock-drift by observing signals available in the local environment. These signals are not necessarily intended for providing a positioning or timing function. Such signals have been called "signals of opportunity" ("SoOps"), in the art.

BACKGROUND OF THE INVENTION

It is known to use accurately maintained broadcast, cellular and navigation signals for providing a timing reference. Example signals are frequency standards and broadcast radio clock signals, cellular base stations, and Loran.
Typically, the signals are:
Designed specifically for providing a time or frequency reference (for example frequency standard transmitters);
Designed for navigation purposes (for example eLoran transmitters);
Designed for some other purpose, but requiring accurate timekeeping for that other purpose (for example CDMA cellular base stations); or
Designed for some other purpose, but implemented for convenience to have accurate timekeeping (for example broadcast transmitters).
It has been observed that some signals designed for some other purpose—so called "signals of opportunity"—are very stable in their timekeeping, and indeed some are substantially synchronised to GPS. Their transmitter-location is normally also fixed.
The timing of many of these signals of opportunity may be reliable and known at the transmitter (or at a reference station listening to the transmitter). This may mean, for example, that a given portion of the signal is transmitted by the transmitter at a precisely known time instant, relative to the reference clock.
For low accuracy applications, the timing at the receiver can be taken to be that of the transmitter. That is, a receiver can assume that the time of arrival of the signal, which it observes, is identical to the precisely known time instant of transmission at the transmitter. This approximation ignores the propagation delay between the transmitter and the receiver. The advantage of ignoring propagation delay is that the time can be estimated even if the current device location is unknown.
For some applications this low-accuracy approach is sufficient—the time-error produced by the propagation of the signal from the transmitter to the user's receiver (and optionally to the reference station) is so small that it can safely be ignored.
For precision-timing applications, where reliability is important, the foundation time reference may be a Global Navigation Satellite System (GNSS) such as the Global Positioning System (GPS), and the signal of opportunity may be a back-up. In these applications, the receiver device location is fixed, and the secondary signal, the signal of opportunity is monitored to maintain accurate timing operation, when needed. In this case, the secondary signal is calibrated at the receiver—in the location where it is used—by comparing it with the foundation time reference (e.g. GPS) in normal operation. For example, the time of arrival of a portion of the signal of opportunity could be determined precisely according to GPS time, when GPS signals are available. This will establish a fixed offset relationship between GPS time and the arrival times of subsequent portions of the signal of opportunity, because the signal of opportunity is synchronised to GPS time. Even if GPS reception is lost, the device can still maintain accurate timing, by detecting the times of arrival of subsequent portions of the signal of opportunity. This can produce accurate results as long as the device location does not change.

SUMMARY OF THE INVENTION

According to an aspect of the present invention, there is provided a method, for a movable device having a local clock, of determining a drift between the local clock and a reference clock that is used by one or more reference devices, by observing one or more signals transmitted by the respective one or more reference devices, the method comprising:
when the movable device is at a calibration location, receiving, at a first time, a first portion of the signal transmitted by one of the reference devices;
moving the movable device to an operating location; and
when the movable device is at the operating location, receiving, at a second time, a second portion of the signal transmitted by one of the reference devices, the first portion and the second portion having been transmitted with a time-interval between them, according to the reference clock;
the method further comprising:
determining the time-interval;
obtaining a model of the one or more signals, describing at least one of:
a direction of propagation of each of the one or more signals, and
the location of each of the one or more reference devices;
determining local time information comprising: the first time and the second time, or a time difference between them, according to the local clock;
defining position variables comprising:
the calibration location and the operating location, or
a displacement vector between them;
constructing a set of one or more equations, which relates the position variables, the model, the local time information, the time-interval, and the drift; and
solving the set of one or more equations, to determine the drift.

The present inventor has recognised that some methods of time-synchronisation, such as those discussed earlier above, are prone to error if the device location changes. Nevertheless, in some circumstances it may be desirable or essential for the device to move between a calibration location (for example, outdoors) and an operating location (for example, in the cellar).

For example, in the prior art method discussed above, reception of GNSS signals may be lost when moving from the calibration location to the operating location The device may attempt to maintain timing synchronisation by using the signal of opportunity. The operating location would then be assumed to be the same as the calibration location—ignoring the (unknown) displacement vector by which the device has moved. This approximation results in a timing error, because the signal of opportunity travels a little further (or a little less far) to the operating location, compared with the calibration location. Therefore, it arrives a little later (or earlier) than it would at the calibration location.

Embodiments of the present invention can allow timing synchronisation to be maintained at an operating location that is different from the calibration location, without needing to know (in advance of the calculation) where the operating location is relative to the calibration location—and without the need for GNSS reception at the operating location, in particular. In embodiments, this is done by gathering information about the observed timing of one or more signals (SoOps) transmitted by respective reference devices, when the movable device is at the calibration location and when it is at the operating location. A system of simultaneous equations can be constructed and then solved to determine the clock-drift between the local clock of the movable device and the reference clock.

As used herein, the "drift" refers to a timing drift between two clocks. This characterises the rate at which each clock runs, relative to the other—that is, how much faster or slower one clock is, relative to the other. For example, the drift may be represented as a proportion or percentage: if the faster clock counted 11 seconds observed time in the time taken for the slower clock to count 10 seconds observed time, then the drift of the faster clock time could be represented as 10%, or by a factor of 1.1, compared with the slower clock time. Such timing drift is a dimensionless quantity, since it is a measure of time per unit time.

The operating location (and/or the displacement vector from the calibration location) is—in general—not known in advance of determining the drift. In some embodiments, a satellite positioning fix is impossible at the operating location (for example, because the satellite signals cannot be received sufficiently strongly at the operating location). The method can enable the drift to be determined without necessarily determining the operating location. However, the operating location can optionally also be determined as part of the method.

The reference devices are preferably terrestrial transmitters. In general, it is also possible to use extra-terrestrial reference devices, such as geostationary communications satellites; however, the signals from terrestrial reference devices may be more widely available. In particular, they are more likely to be available when satellite positioning signals are unavailable (such as indoors, or outdoors in dense urban environments).

The first portion and the second portion are transmitted with a defined, non-zero time-interval between them, which can be determined by the movable device.

The reference devices all use the same reference clock. That is, they are all synchronised to the reference clock, with essentially no drift. At least one of the references devices may comprise the reference clock, but this is not essential—the reference clock could be remote from all of the reference devices, provided that some means of synchronisation is available.

The first portion and the second portion may be transmitted by the same reference device.

In this case, in general, it is not necessary to know the location of the reference device—the direction of propagation of the signal transmitted by the reference device can be sufficient to allow the drift to be determined.

Optionally, the first portion and the second portion are transmitted by different reference devices; the model comprises the location of each of the reference devices; and the calibration location is known.

In this case, the first portion and the second portion need not be transmitted by the same reference device. This may allow greater flexibility, possibly at the expense of increased complexity. Because the reference devices all use the same reference clock, and because the locations of the reference devices are known (in this case), it is still possible to infer information about time and/or position based on the first time and the second time, for example by modelling the propagation delay from each of the reference devices to the calibration location.

Each of the one or more reference devices is preferably stationary.

This includes examples such as fixed terrestrial transmitters and also geostationary communications satellites. Stationary can be understood as "not moving, with respect to the calibration location".

The method may further comprise: when the movable device is at the calibration location, determining the first time according to the reference clock; and when the movable device is at the operating location, determining the current time according to the reference clock, based on: the first time according to the reference clock; the first time according to the local clock; the current time according to the local clock; and the drift.

In this case, the method extrapolates a known time according the reference clock (at the calibration location, at the first time) to deduce the time according to the reference clock when it would otherwise be unknown (at the operating location at the current time). This can be done by comparing the first time according to the local clock with the current time according to the local clock and correcting for the drift as well as the offset between the local clock and the reference clock. The offset can be determined by comparing the first time according to the local clock with the first time according to the reference clock.

This approach enables the movable device to "bring" the time according to the reference clock from the calibration location to the operating location. This is useful for measuring accurately the timing of events (for example, the instant of arrival of a signal) according to the reference clock, when at the operating location. It is also useful for generating events (for example, transmitting a signal) with precise timing with respect to the reference devices, when at the operating location.

Preferably: the reference clock is synchronised with a clock of a satellite positioning system; the movable device comprises a satellite positioning receiver for use with the satellite positioning system; and the step of determining the first time according to the reference clock comprises determining, using the satellite positioning receiver, the first time according to the clock of the satellite positioning system.

This is particularly useful in the case that the calibration location has good satellite reception, but the operating location does not. The time according to the reference clock can be determined at the operating location, even though the satellite positioning receiver may not be able to receive satellite positioning signals at that location. In other words, this method can facilitate accurate "holdover" of the time according to the clock of the satellite positioning system (for example, GPS time).

The movable device preferably comprises a satellite positioning receiver for determining, using a satellite positioning system, the position of the movable device, and the method preferably further comprises determining the calibration location using the satellite positioning receiver.

Using a satellite positioning receiver is an advantageous way to determine the calibration location (and optionally the time according to the satellite positioning system) accurately, when the calibration location has good satellite reception.

The method may further comprise determining the operating location based on the signals transmitted by the one or more reference devices.

This is a way of determining the operating location based—at least in part—on signals of opportunity (SoOps). In some embodiments, this may comprise solving the set of one or more equations to determine the operating location.

Optionally, three stationary reference devices are synchronised with the reference clock and the method comprises: when the movable device is at the calibration location, receiving, from each of the three reference devices, at respective first times, a first portion of the signal transmitted by that reference device; when the movable device is at the operating location, receiving, from each of the three reference devices, at respective second times, a second portion of the signal transmitted by that reference device, each first portion and second portion having been transmitted by the respective reference device with a respective predetermined time-interval between them, according to the reference clock, wherein the time information comprises: the first times and the second times, or respective time differences between them, according to the local clock.

Signals of opportunity from three different synchronised transmitters are, in general, sufficient to solve for the drift, without the need for additional signals or sources of information, at the operating location. Optionally, these three signals can also be used to solve the set of equations to determine the displacement vector and/or the operating location.

The step of solving the set of equations to determine the drift may be assisted by satellite positioning signals received by the movable device at the operating location.

In general, signals from at least four satellites in a satellite positioning system are needed to calculate time and position. However, information from a smaller number of satellite-signals can be combined with the information obtained from the one or more reference-device signals, to allow the drift to be determined.

The satellite signals can be regarded as another set of signals coming from reference transmitters, which are moving according to a known orbit, or could be handled as a constraint-input giving a position vs. local clock equation to put alongside the signal of opportunity equation to help solve for drift.

The model may comprise the direction of propagation of each of the one or more signals and the direction of propagation of at least one signal may be different from the straight-line direction to the respective reference device from which the signal was transmitted.

This is a local model, which models how the radio waves propagate in the neighbourhood of the calibration location and the operating location. This may be different from the straight line direction to the transmitter.

The local wave propagation model characterises how the signal propagates in the neighbourhood of the calibration location and the operating location. In general, the local direction (and speed) of propagation may or may not be the same as those modelled by a direct line-of-sight to the transmitter (for example because of reflection or diffraction caused by obstacles or changes in the medium over which the signal is travelling (for example land or water).

The direction of propagation may be determined without reference to the position of the transmitter from which the signal originated.

To put this differently: the direction of propagation used in the wave propagation model is not necessarily the same as the straight-line direction from the transmitter. This is because, in the real world, the direction of propagation at any given position may be different from the straight-line direction between the transmitter and that position. In the real-world, signals do not always propagate along a direct line-of-sight from the transmitter. For example, the direction of propagation may be altered by diffraction or reflection, caused by obstacles.

Embodiments of the present method can be robust to the effects of such obstacles, because the propagation direction is not necessarily based on a model of straight-line propagation from the transmitter. Instead, preferably, the propagation direction is determined based on local observations of the signal—that is, measurements in the neighbourhood of the calibration location and independent of knowledge of the precise transmitter location.

In some embodiments, therefore, the direction of propagation used in the method is different from the straight-line direction between the transmitter from which the signal originated and the local neighbourhood (of the calibration location and operating location). Here, "different" means that there is an angular difference between the two directions of preferably greater than 5°, more preferably greater than 15°.

The present inventor has recognised that the reliance upon known transmitter locations can be avoided through the use of a local model of wave propagation. This model describes only how the signal travels in the local neighbourhood that is of interest. In such an embodiment, the present method allows a SoOp to be used without needing to know accurately or to estimate accurately the transmitter location. Therefore, inaccurately reported transmitter locations cannot cause errors. Moreover, reflected signals can be used successfully in the positioning method, provided that the propagation of the reflected signal is consistent throughout the neighbourhood of interest.

The position of the transmitter (that is, the reference device) may be unknown. Furthermore, the drift is preferably calculated independently of the position of the transmitter (even when the position of the transmitter is explicitly available).

In embodiments, the structure of each signal of opportunity used in the method is known, in the sense that it is possible to determine the relative times of transmission of different parts of the signal from the reference device (transmitter). The determination could be made before or after the respective parts of the signal have been received. A determination (prediction) may be made beforehand if, for example, the signal comprises a regular repetitive structure with a known period of repetition. In practice, the structures of many types of signals are known from technical standards. However, a repetitive structure could also become known to the receiver by observation of the signal over a sufficiently long period of time, wherein the receiver learns the structure of the signal—for example, an identifiable periodicity or repetition in the signal or its contents. In other cases, the determination may be made after reception. For example, some signals of opportunity may incorporate an explicit time stamp, indicating the time instant (as determined at the transmitter) when the corresponding part of the signal was transmitted. In this case, the relative times of transmission of different parts of the signal can be determined by decoding and comparing their time stamps. In all cases, it is assumed that the clock in the transmitter is reasonably accurate or stable over the timescales involved.

Inaccuracy in the transmitter clock may affect the accuracy of the position calculation (unless this inaccuracy can itself be characterised reliably).

Also provided is a non-transitory computer-readable medium containing a computer program comprising computer program code means adapted to control a physical computing device to perform all the steps of any preceding claim if said program is run on the physical computing device.

According to another aspect of the invention, there is provided a movable device comprising:

a local clock;

a receiver, adapted to receive one or more signals transmitted by respective one or more reference devices, wherein the reference devices use a reference clock; and a processor, adapted to determine a drift between the local clock and the reference clock, wherein the receiver is adapted to:

receive, at a calibration location at a first time, a first portion of the signal transmitted by one of the reference devices; and receive, at an operating location at a second time, a second portion of the signal transmitted by one of the reference devices, the first portion and the second portion having been transmitted with a time-interval between them, said time-interval being defined according to the reference clock, and wherein the processor is adapted to:

determine the time-interval;

obtain a model of the one or more signals, describing at least one of: a direction of propagation of each of the one or more signals, and the location of each of the one or more reference devices;

determine local time information comprising: the first time and the second time, or a time difference between them, according to the local clock;

define position variables comprising: the calibration location and the operating location, or a displacement vector between them;

construct a set of one or more equations, which relates the position variables, the model, the local time information, the time-interval, and the drift; and solving the set of one or more equations, to determine the drift.

The device preferably comprises at least one of: a cellular base station, preferably an indoor cellular base station; and a wireless-network access point.

For example, the movable device may be a small cell base station, such as a picocell or femtocell base station. The cellular base station may comprise a satellite positioning receiver, which can be used to accurately calibrate the clock of the base station when the device is outdoors, at a calibration location, where satellite positioning signals are available. In one embodiment of the invention, the movable device is then moved to an operating location, where satellite positioning signals might not be available. By observing the signals received from the reference devices, the movable device can determine (and optionally correct for) the clock-drift of its local clock—even though the satellite positioning signals are unavailable, and even though the signals transmitted by the reference devices do not necessarily contain explicit time-information.

Alternatively, or in addition, the device may comprise at least one of:

one among a set of wireless reference beacons, each of which is adapted to transmit a beacon signal with a predetermined timing relationship to the other beacons, for a remote device receiving the beacon signals to calculate its position by trilateration; and one among a set of wireless reference receivers, each of which is adapted to receive a signal from a remote device and determine the time of arrival of the signal, for calculating the position of that remote device by trilateration.

It would be desirable to provide a synchronised network of reference transmitters or receivers for supporting localization methods by trilateration. Such a network could be deployed over a site (indoors or outdoors, or both) where accurate localization of remote devices is desired. The network may comprise reference beacons, which are synchronised transmitters that transmit beacon signals with a defined timing relationship among them. A remote device may receive the beacon signals and calculate its position by trilateration, by comparing the relative times of arrival of the signals. Alternatively, the network may comprise reference receivers, which are synchronised and interconnected receivers that receive a signal transmitted by a remote device. By comparing the respective times of arrival of the signal at the different synchronised receivers, it is possible to determine the position of the remote device by trilateration. Here, "synchronised" means that the network of beacons or receivers, respectively, has a common timing reference. In both cases, it is desirable to have a convenient and reliable method for establishing and maintaining the common timing reference at each device. Embodiments of the present invention provide one useful way of achieving this.

The one or more reference devices preferably include at least one of: a cellular base station; a wireless-network access point; one of a synchronised set of wireless reference beacons; one of a synchronised set of wireless reference receivers; a terrestrial digital television or digital audio broadcast transmitter; and a geostationary communications satellite.

BRIEF DESCRIPTION OF THE DRAWINGS

The invention will now be described by way of example with reference to the accompanying drawings, in which.

Figure 1:
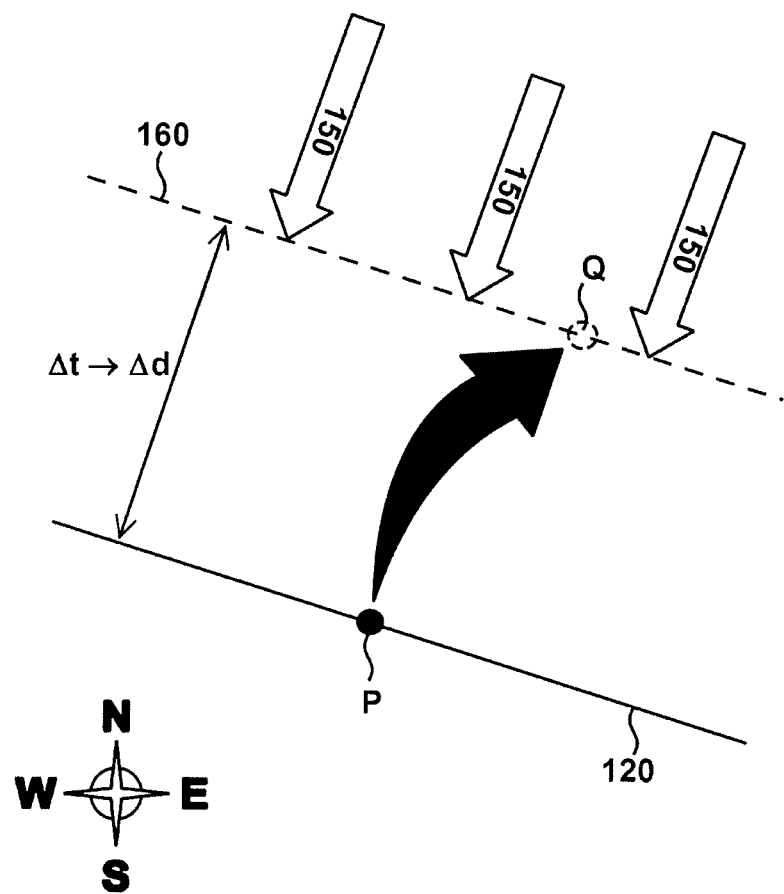
FIG. 1 illustrates a method of determining clock drift according to an embodiment of the invention, using a linear model of wave propagation.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

SoOps have been used previously for determining position (or assisting in the determination of position). One such method was proposed by the present inventor, in EP 2634593 A1. Descriptions of the use of signals of opportunity often assume an accurate local clock to maintain a timing reference and then use the SoOps to determine the position. It has now been recognised that SoOps can be used in other ways, such as assuming position and finding time, or finding both position and time.

Embodiments of the present invention extend the idea of using SoOps to determine position, by using SoOps to determine accurate timing—and more particularly, to determine a drift parameter that relates a local clock to a reference clock. This use of SoOps may be useful for extending accurate timing into areas where GNSS signals are weak or not available.

Embodiments can therefore provide a solution for applications where the device moves, where GNSS may not always be available, but where very high accuracy and reliability of timing are still required. In such situations the movable device cannot rely fully on GNSS, and it cannot be assumed that the device is in the same location as it was when time synchronisation was previously performed.

According to embodiments, at least one signal of opportunity can be used to assist in the estimation of time by the receiver. Typically, the information derived from one signal of opportunity will be combined with other information, in order to estimate time at the receiver. For example, multiple SoOps may be used, or one or more SoOps may be used together with explicit location information, GNSS signals, inertial sensors or other means.

The timing reference can be established by one or more previous calibration measurements carried out by the same device in at least one calibration location. This establishes the timing of the received signals at the calibration location. This means that the method can be independent of measurements of the transmitter and of the movable device with respect to an external reference, e.g. UTC.

Embodiments of the method use a model of how the time of arrival of signals from one or more reference devices varies with observation location (that is, the location of the movable device). In one example, this model is based on propagation from a transmitter at a known transmitter location to a known calibration location. In another example, the transmitter location may be unknown and the model is a local model, comprising a direction of propagation in a local neighbourhood around the calibration location. This makes the method independent of propagation effects, provided that the signal is locally consistent. This also makes the method robust against uncertainty in the location of the transmitter.

In the operating location (which is, in general, different from the calibration location) the signals from the reference devices are again measured, and the observations are used, together with the calibration measurements and the model, to establish the timing in the new current location.

In some embodiments, the (or each) calibration location is known.

In some embodiments, the operating location may be known (despite being different from a calibration location) and a single signal of opportunity may be sufficient for determining the drift. By "known" it is meant that the operating location is known at least relative to the calibration location. For example, the operating location may be known from explicit forms of location information, including but not limited to: geographical location constraints; or external input of the location.

Depending on how the equations are formulated, just the current time is output, or the current location (operating location) may be jointly output together with the current time. For example, there may be 3 equations and 3 unknowns, for latitude, longitude, and time.

In some embodiments, the movable device estimates a new position and time solution, relative to a known calibration location and time at that calibration location. Therefore, the device may calculate and provide the difference in time, rather than the absolute time. It may then calibrate clock drift or frequency offset without determining the absolute time.

Embodiments of the invention may be useful in a variety of applications. Exemplary applications are those which extend the ability to provide time into areas where GNSS is not available, for example:

For a femtocell device (a small, low-power cellular base station) which is synchronised outdoors, and then brought inside a large building for installation;

Other applications where there is a need to maintain the time capability for tracking outdoors, into indoor environments; that is the ability to keep a local clock synchronized with accurate time, by keeping synchronized to timing derived from GNSS;

To maintain timing performance of movable/portable devices, despite GNSS problems or jamming; for example, in the context of portable base stations, or terminals for making and validating time-critical financial transactions.

For a GNSS receiver, to maintain an accurate local clock (despite, for example, temperature variations), in order to be able to acquire weak GNSS satellite signals and calculate a position. Having an accurate time reference can enable narrowing of the search range (in phase and frequency) when attempting to acquire GNSS signals. With a narrower range to search, more computational effort can be invested in that range (for example, by using longer integration times in correlation operations). Without an accurate time reference, the uncertainty in time might be much greater than the uncertainty in distance, limiting the acquisition and positioning performance of the device.

Figure 2:
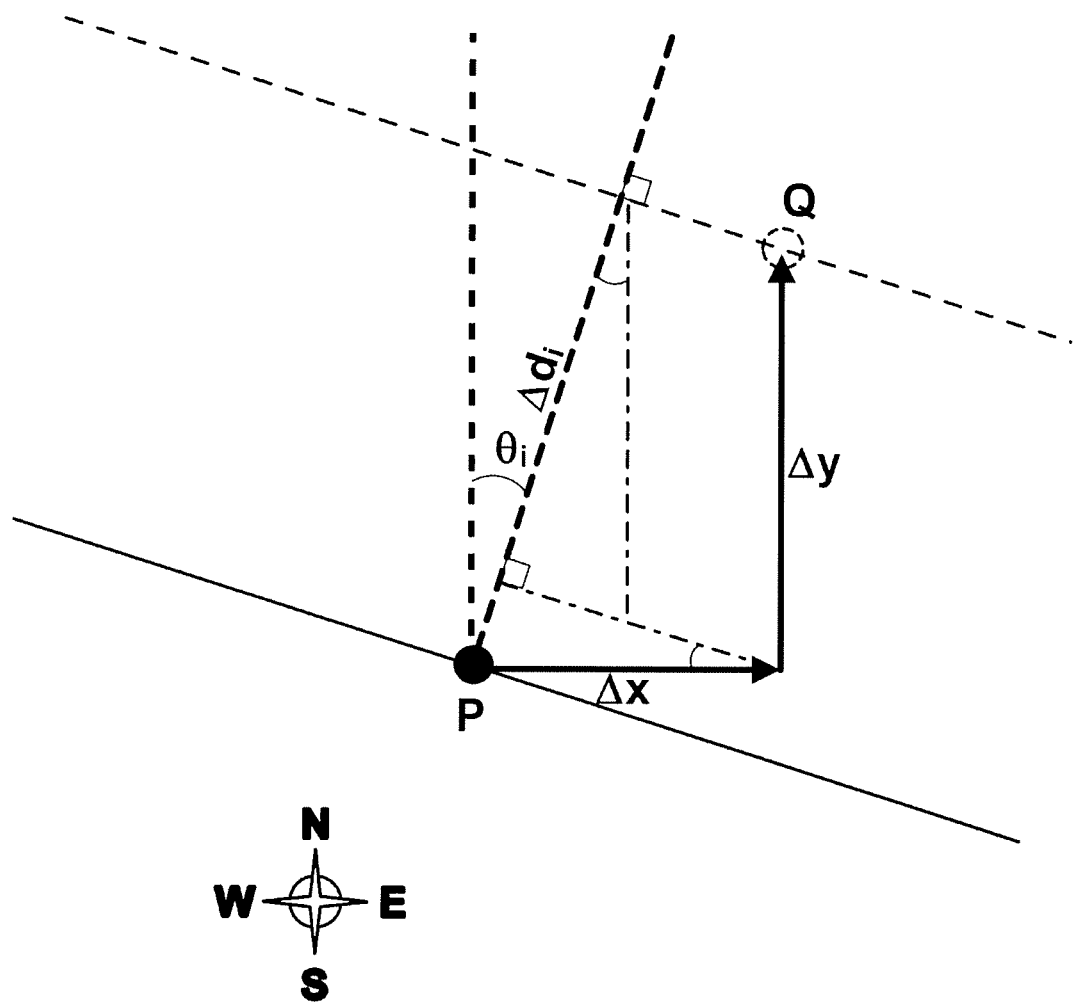
FIG. 2 is simplification of the geometry of FIG. 1.
Figure 3:
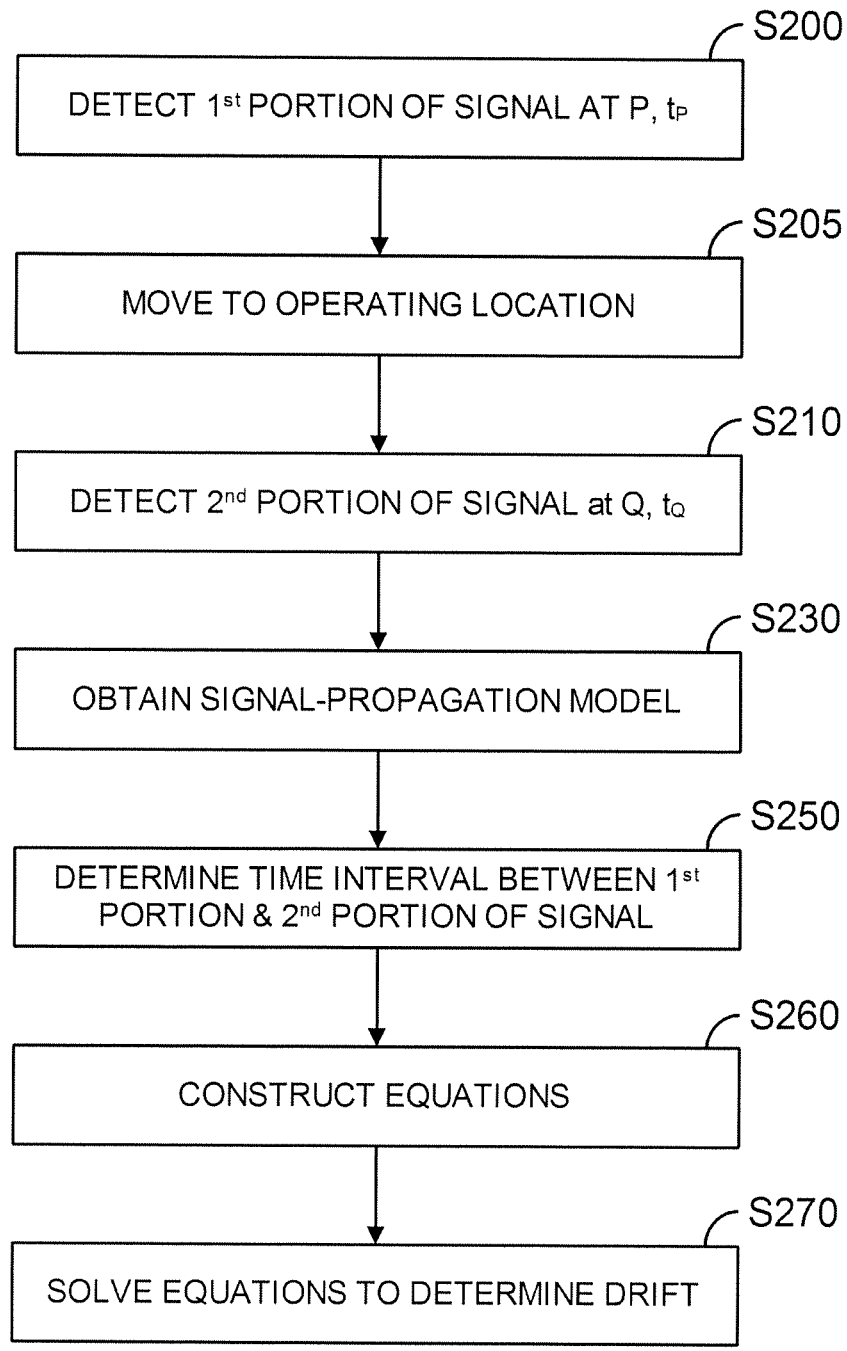
FIG. 3 is a flowchart illustrating the method applied in the present embodiment, using the geometry shown in FIGS. 1-2.
Figure 4:
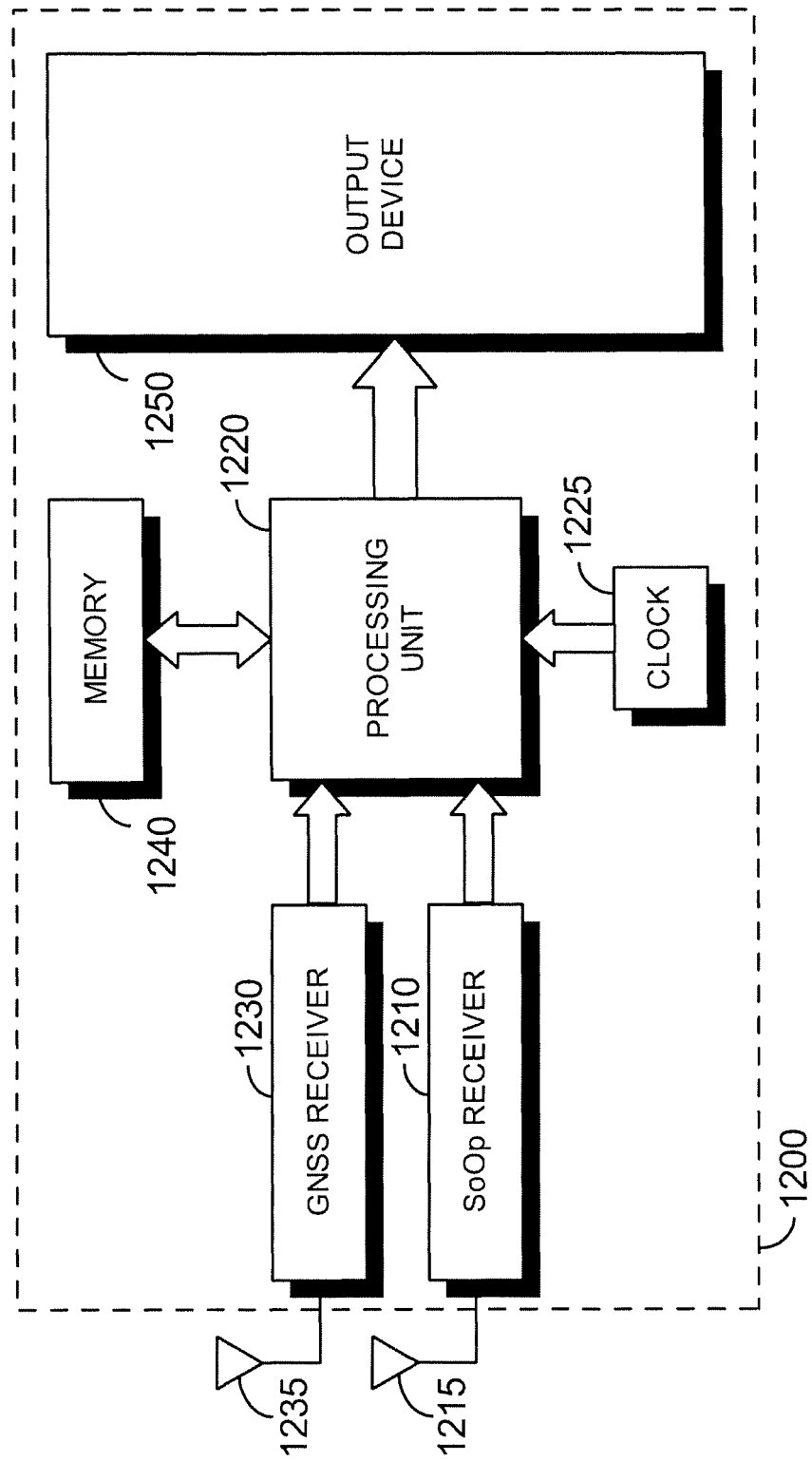
FIG. 4 is a block diagram of a movable device according to an embodiment.

A method according to a first exemplary embodiment of the invention will now be described, with reference to FIGS. 1-4. FIG. 1 is sketch of the geometry that is assumed in the method. The drawing is a plan view of a geographical area. It is assumed that the area is flat, so that all valid locations are co-planar, in a horizontal plane. Consequently, altitude need not be taken into account, in this simple example. FIG. 2 is a sketch of a simplified geometry, based on FIG. 1, which illustrates how a set of equations can be constructed based on the assumed geometry. FIG. 3 is a flowchart for the method and FIG. 4 is a block diagram of the movable device 1200.

It is desired to determine the drift of a local clock 1225 of a movable device 1200, when the device is at an unknown operating location Q. The clock 1225 is first "calibrated" at a calibration location P.

The sketch of FIG. 1 shows the wavefront 120 of a signal of opportunity that is transmitted by a distant transmitter (not shown). The transmitter comprises a reference device, which transmits its signal with a timing that is synchronised with a reference clock. The wavefront 120 is modelled as a straight line (in 2D) because of the large distance from the transmitter. The wavefront 120 indicates a locus of positions at which the signal arrives simultaneously. The calibration location P is one of these locations. The direction of propagation of the wave is indicated by arrows 150. Under the linear model, the wave propagates in a direction normal to the wavefront. The signal transmitted by the reference device has a regular repeating structure, wherein an identifiable portion of the signal (such as a synchronisation symbol) is transmitted with a fixed period. In the present example, the repeating structure of the signal comprises a plurality of frames and the fixed period is the frame interval. Observations of regularly repeating portions of the signal (for example, the start of a frame) can be used by the movable device to deduce information about its current operating location, and the correct time according to the reference clock, at that operating location. In this example, the movable device 1200 is a femtocell base station, comprising a GNSS receiver and a separate receiver for terrestrial signals of opportunity. For a femtocell base station, it is convenient to use the signals of other cellular base stations as the signals of opportunity. That is, the reference devices in this example are cellular base stations.

The movable femtocell base station 1200 comprises a receiver 1210 adapted to receive signals of opportunity, which is coupled to an associated antenna 1215. It also comprises a processing unit 1220 for performing calculations and determining the clock-drift. A clock 1225 is provided, for measuring the times of arrival of different portions of the signal of opportunity. The processing unit is coupled to and receives data from the SoOp receiver 1210. The processing unit 1220 is also coupled to and receives data from a GNSS receiver 1230. The GNSS receiver 1230 is adapted to receive satellite positioning signals via an antenna 1235 and to process them to calculate a position fix, when satellite signals are available. As part of the position fix, the GNSS receiver 1230 also obtains the current satellite system time at the instant of the position fix.

The method will now be described by reference to the flowchart of FIG. 3. In step S200, the receiver 1210 detects the arrival of a first portion of the signal of opportunity, while the receiver is located at the calibration location P. The processing unit 1220 records the time of arrival, $t_P$, of the first portion of the signal, using the local clock 1225. In general this clock may be running faster or slower than the reference clock (satellite system time). Therefore, the clock will drift slowly, over time, relative to satellite system time.

The recorded time of arrival of the first portion of the signal at P is denoted $t_P$. In step S205, the device then moves to an unknown operating location Q. At this location Q, the receiver 1210 is still able to detect the terrestrial signal of opportunity. It makes a further measurement, in step S210, of the time of arrival of a second portion of the signal at the operating location Q, recording this time as $t_Q$. Once again, this time is established using the internal clock 1225.

If $f_P$ and $f_Q$ are the frame numbers of the first portion (received at P) and the second portion (received at Q) of the signal, respectively, and the frame interval is h, then the distance that the device 1200 has moved, parallel to the propagation direction 150, is given by:

$$\Delta d = c \cdot [(t_Q - t_P) - (1+u) \cdot h \cdot (f_Q - f_P)] \quad (1)$$

Here, c is the speed of light (the propagation speed of the radio waves making up the signal), and $t_Q$ and $t_P$ are the times as measured by the receiver local clock. Meanwhile, u is the timing drift of the transmitter clock relative to the local clock 1225 in the receiver, as measured by the local receiver clock 1225. Since the transmitter clock is synchronised with the reference clock (satellite system time), the variable u represents the drift between the local clock 1225 and the reference clock. The drift, u, is a timing drift per unit time; therefore, it is a dimensionless quantity. A positive drift u means that the elapsed time taken by the frames as measured by the local receiver clock is greater than that which it actually is as measured by the transmitter. This means that the local clock in the receiver is running faster than the reference clock in the transmitter The present example assumes linear drift. That is, the local clock 1225 is running at a constant rate, which may be faster or slower than the reference clock, but is related to the reference clock by a constant factor.

The signal structure parameters, h, $f_Q$, and $f_P$, are known at the movable device 1200 and the frame interval, h, is assumed constant in this example. The frame numbers may be explicitly indicated in the signal and decoded by the receiver 1210. Alternatively, the receiver may count the number of frames observed between the observations at the calibration location P and the operating location Q. That is, in some embodiments, the frame numbers $f_Q$ and $f_P$ may be assigned by a counter in the movable device 1200.

In step S230, the processor obtains a propagation model of the signal of opportunity. In the present example, the model comprises the direction of propagation of the signal, in the neighbourhood of the calibration location and the operating location. Because these locations are far from the transmitter, this direction 150 is assumed to be the same in both locations (see FIG. 1).

In step S250, the processor calculates the time interval between the time of transmission of the first portion of the signal and the time of transmission of the second portion of the signal. This is given by the expression $h \cdot (f_Q - f_P)$. In step S260, the processor constructs a system of linear simultaneous equations. These equations relate the displacement $\Delta d$, the direction of propagation, the times $t_P$ and $t_Q$ measured by the local clock 1225, the time interval $h \cdot (f_Q - f_P)$ and the drift. One equation is constructed for each signal of opportunity. The construction of the equations will be described in greater detail below. Once the equations have been constructed, they are solved, in step S270, to determine the drift.

The construction of the equations used to determine the drift, according to the present embodiment, will now be described in greater detail.

The change in distance that can be deduced as a result of measurements of a signal of frame interval h and frame count $f_Q$, $f_P$ at the operating location Q and a calibration location P is given by equation (1) above. The drift, u, is the timing at the current location relative to the reference which is unknown and it is this variable which it is desired to determine.

The movable device makes measurements of three signals of opportunity i, i=1 . . . 3, from three respective reference devices (base stations). Therefore, equation (1) can be rewritten for each signal:

$$\Delta d_i = c \cdot [(t_{Qi} - t_{Pi}) - (1+u) \cdot h \cdot (f_{Qi} - f_{Pi})] \quad (2)$$

The timings $t_{Pi}$ and $t_{Qi}$ are measured by the device local clock 1225, as explained above. The time interval $h \cdot (f_{Qi} - f_{Pi})$ is the time interval between two known signal events (frames) transmitted by the transmitter, in the frame of reference of the clock of the stationary transmitter. These two known events have a time separation in the frame of reference of the transmitter clock which is known by the receiver (in this example, by the communication of the transmitter to the receiver of the frame counts, and the known fixed frame time). The measured occurrence of these two events, as observed by the receiver and measured by the receiver's local clock, differs from the time difference between them at the transmitter, as a result of the movement of the device and as a result of the drift of the device's local clock 1225. By distinguishing between these two effects and solving for the drift, the processor can establish accurately the correct timing of the local clock 1225.

The formulation of the time interval change between known events as a (constant) drift is particularly suitable for a linear drift of the clock frequency in time, and for making measurements of the visible signals of opportunity at different times. A variety of different signal propagation models could be used for the signals of opportunity. Here we consider the case where, for each of the three signals of opportunity, a local wavefront model has been built with known incident direction and timing at the calibration location P.

FIG. 2 gives further details and defines the terminology. The signal of opportunity wavefront is incident with a direction of propagation $\theta_i$ and the device moves from the calibration location P to the operating location Q. The direction of propagation is a bearing with respect to some convenient reference (for example, North). The distance moved in the direction of propagation of the $i^{th}$ signal of opportunity is $\Delta d_i$ From the construction of FIG. 2 it can be seen that the distance moved by the device in the direction of travel of the signal wavefront for the $i^{th}$ signal of opportunity with planar wavefront incident from a known bearing $\theta_i$ is then:

$$\Delta d_i = -(\Delta x \cdot \sin(\theta_i) + \Delta y \cdot \cos(\theta_i)) \quad (3)$$

where $\Delta x = x_Q - x_P$ in the easterly direction and $\Delta y = y_Q - y_P$ in the northerly direction. For convenience, writing the time measurement difference $(t_{Qi} - t_{Pi})$ as $\Delta t_i$ and the frame count difference $(f_{Qi} - f_{Pi})$ as $\Delta f_i$, we then have:

$$\Delta x \cdot \sin(\theta_i) + \Delta y \cdot \cos(\theta_i) = -c \cdot [\Delta t_i - (1+u) \cdot h \cdot \Delta f_i] \quad (4)$$

From the measurements at P and Q of the three signals of opportunity (transmitted by three respective base stations) we have the three measurements, $\Delta t_i$, i=1 . . . 3 each with a corresponding known frame count difference $\Delta f_i$, and we have three unknowns, $\Delta x$, $\Delta y$, and u. The three equations and three unknowns can be solved to establish the drift rate, u, in time of the transmitters as observed by the local clock 1225.

Figure 5:
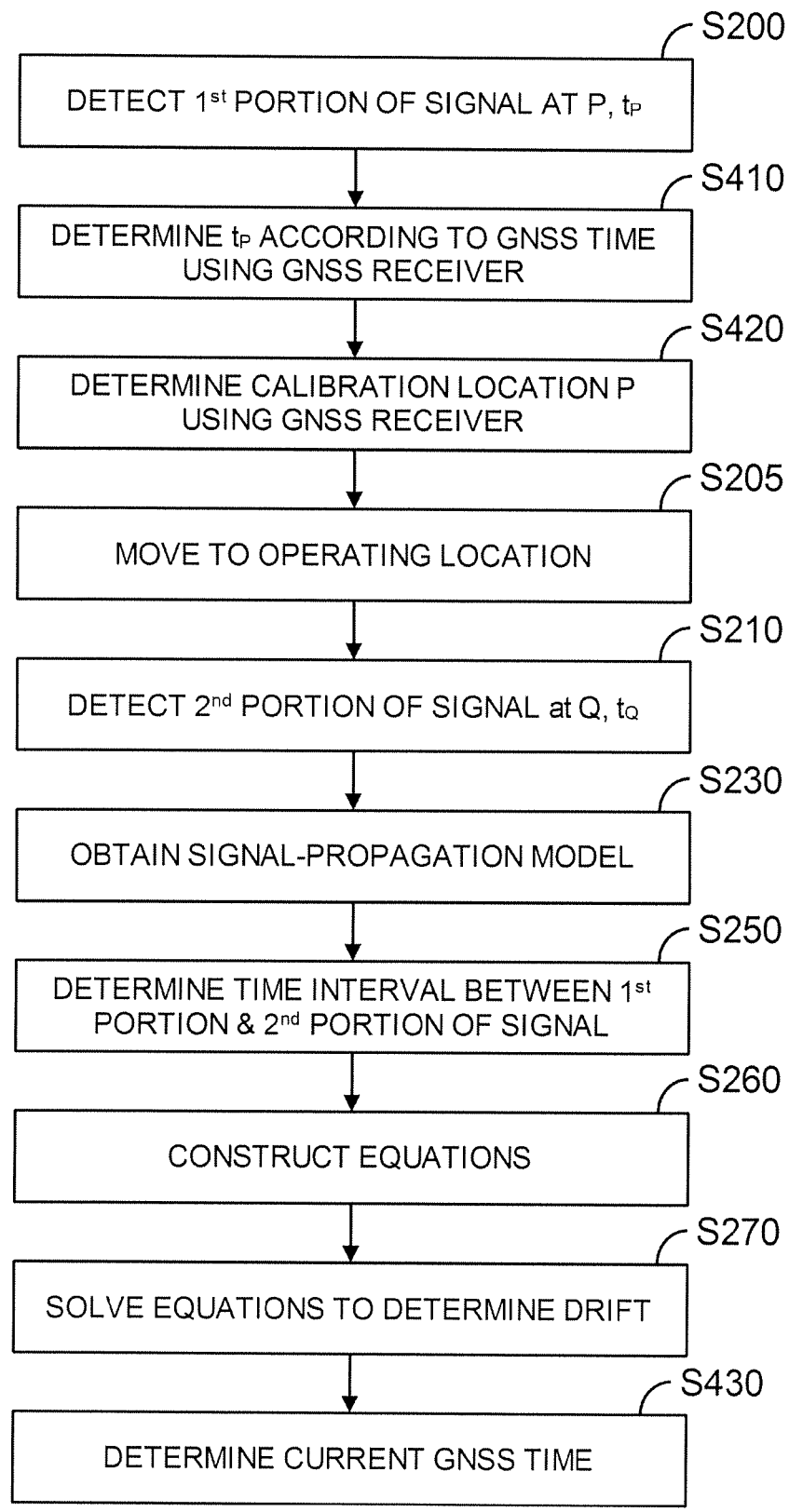
FIG. 5 is a flowchart of a method according to a second embodiment.

The above has resulted in a measurement of the drift rate in time of the signal of opportunity of the transmitters as seen by the local device clock 1225. In a second embodiment of the invention, the receiver would then like to establish its absolute time, in the frame of reference of the transmitters and their accurate clock (for example, UTC or GPS time). FIG. 5 is a flowchart illustrating a method which does this.

FIG. 5 includes all the steps of FIG. 3, with three additional steps. For the embodiment of FIG. 5, it is assumed that the device is able to calculate its position and the current time at the calibration location P, using the GNSS receiver 1230, thus providing a known calibration location P. While the device 1200 is at the calibration location, in addition to recording the time of arrival, $t_P$, of the first portion of the signal, according to the local clock (step S200), it also records, in step S410, the corresponding time according to the reference clock (as calculated by the GNSS receiver 1230). Similarly, in step S420, the calibration location P is calculated by the GNSS receiver 1230 and recorded.

When the device is at the operating location Q, satellite positioning fails. This location Q may be in a dense urban environment, under foliage or inside a building. Equally, satellite positioning may have failed due to accidental or malicious jamming of the GNSS satellite signals. Therefore, the time of arrival $t_Q$ of the second portion of the signal is established only using the internal clock 1225, because a GNSS time/position fix is unavailable. This is the same as step S210 in FIG. 3.

Knowledge of the time according to the reference clock at the calibration location P, as determined in step S410, enables the processor 1220 to calculate the time according to the reference clock when the device 1200 is at the operating location Q, despite not being able to receive GNSS signals in this location.

To determine the current time according to the reference clock, at the operating location Q, the processor uses the time of arrival of the first portion of the signal according to the local clock 1225; the time of arrival of that portion according to the reference clock; the current time according to the local clock; and the drift. This calculation is performed in step S430.

Having established the clock drift u, we will now look at using this to establish the local time accurately at the operating location Q. Simply, as the transmitter has been established to drift by u. $\Delta t_i$ as measured by the clock in the movable device, then in the period since it was calibrated at Q then the clock in the movable device has drifted by $-u \cdot \Delta t_i$ as measured by the accurate clock in the transmitter.

This is an approximation, but is a good first order correction valid for the small fractional clock drifts expected.

The clock in the movable device should therefore be corrected by $-u \cdot \Delta t_i$ in order to maintain its calibration and provide accurate time for continuing operation.

A more complete worked analysis leading to the same general result is as follows.

Let us define:
The small fractional drift of the transmitter as observed and measured by the movable device is u A time interval in the transmitter of S. For example, in the case of the time interval between the use in the calibration location P and the operating location Q this would be $\Delta T_{Ti}$. Once u is measured, the drift rate can be used to correct the local clock time over a longer operational period.

The same time interval measured by the movable device of S'

The clock error (movable device clock−transmitter clock) of the local clock in the movable device with respect to the transmitter clock as would be accurately measured by the transmitter $\delta t$ The correction (transmitter clock−movable device clock) of the transmitter clock with respect to the local clock $\delta t'$ in the movable device as would be measured and to be implemented by the movable device.

For ease of discussion we will assume u is positive, that is, that the transmitter clock is running slower in comparison with the clock in the movable device and that the actual duration of an interval, as measured by the transmitter clock, is shorter than it appears to the clock in the movable device.

We also assume that the events are observable at the same time in the transmitter and the movable device (or at least with a constant delay between the observation in the two devices due to a constant propagation delay). This is a negligible simplification when considering any significant delay between the calibration occasion and the operation occasion.

Then we have:
An interval determined by the accurate clock in the transmitter is observed to be longer when measured by the clock in the movable device $$S' = (1+u) \cdot S$$

and an interval determined by the clock in the moveable device is measured to be shorter (take less time) when measured by the accurate clock in the transmitter $$S = S'/(1+u)$$

The clock error in the moveable device as measured by the accurate transmitter clock is straightforward $$\delta t = S' - S = (1+u) \cdot S - S = uS$$

But the correction to be applied of the interval in the transmitter clock with respect to the clock interval in the moveable device, as measured by the clock in the moveable device, uses only observables available to the moveable device, and takes into account that the clock in the moveable device is drifting $$\delta t' = S - S' = S'/(1+u) - S' = S'((1+u)^{-1} - 1)$$

Using the expansion for small drift u then results in $$\delta t' = S'((1 - u + u^2 \ldots - 1)$$

and hence the correction simplifies for the very small drift u we have in practice to $$\delta t' \approx -uS'$$

Or at Q, $$\delta t' = -u \cdot h \cdot \Delta f_i = -u \cdot \Delta t_i$$

The first and second embodiments, explained above, use a model of signal propagation comprising the direction of propagation in the neighbourhood of the calibration location (and operating location). This direction of propagation can be obtained in a variety of ways, including those described in EP 2634593 A1 (see FIGS. 4-10 of that document).

Different models can also be used for the (or each) signal of opportunity. For example, a transmitter at a given location with given timing at the transmitter, or a transmitter at a given location with a known timing at a calibration location, or a local wavefront with a direction and timing at a calibration location.

Depending on how the signals are modelled, other constraints which are present in the embodiments discussed above may be relaxed. For example, if the locations of the transmitters (that is, the reference devices) are known to the movable device, then it is possible to observe a first portion of a signal from one transmitter and a second portion of a signal from another transmitter. This is possible because the transmitters are all synchronised to the reference clock. This knowledge, combined with information about the transmitter locations can be used to compensate for the different times of flight of the first and second signal portions from their respective transmitters to the calibration location and operating location, respectively.

In the embodiments described above, the position variables that were defined comprised a displacement vector ($\Delta x$, $\Delta y$) between the calibration location P and the operating location Q. These position variables were used in equation (4), when constructing the simultaneous equations for determining the drift. As those skilled in the art will appreciate, the equations could be written in terms of different variables, in another embodiment. In particular, the position variables may comprise the calibration location and the operating location themselves. This formulation may be particularly appropriate in the case that the calibration location is known (for example, from GNSS) and it is desired to calculate the operating location as well as the drift, from the set of simultaneous equations.

Also, it is noted that the position variables need not be latitude and longitude (although this is assumed, for convenience, throughout the embodiments described above). Those skilled in the art can choose different frames of reference according to the intended application of the method.

As suggested in the embodiments described above, the local time information determined by the clock 1225 of the movable device 1200 can comprise the first time and the second time ($t_{Qi}$ and $t_{Pi}$), which are the times of arrival of the first portion and the second portion of the signal, respectively. However, in other embodiments, the local time information can comprise merely the time difference between these two times. This was denoted $\Delta t_i$ in equation (4) above. As will be apparent from the detailed description above, the set of simultaneous equations can be formulated using either form of time information, according to which is most convenient.

As mentioned already above, one useful application of embodiments of the present invention is to help a small-cell base station (especially an indoor base station) to establish and/or maintain accurate timing, relative to the other base stations in a cellular network.

Another example scenario is a network of transmitter or receiver devices designed for localization via trilateration. Several schemes for exchanging signals to do short-range distance measurements are known—for example, IEEE802.15.4a provides options for wireless signals for this purpose: either a Chirp Spread Spectrum signal in the 2.4 GHz ISM band or an Ultra Wide Band signal in a number of frequency bands. Positioning methods using this type of approach require a plurality of transmitters or receivers to transmit/receive the positioning signals. These devices should have an accurate shared timing reference, in order to allow accurate calculation of position.

The trilateration can be done with the mobile device receiving the signals from the reference devices (called "beacons", here), the beacons being in known places and the signals being transmitted by each beacon at known times (synchronised with respect to one another), so that the mobile device can then accurately measure the relative time of arrival of the signals from the separate beacons, and so measure the time of flight from each.

Alternatively, the trilateration can be done with the mobile device transmitting a signal that is then received by the set of reference devices, (called "anchors" here), the anchors being in known places, and the infrastructure being able to measure the accurate relative time of arrival of the transmitted signal at each of the different anchors. Again in this case, it is desirable that each anchor has a clock that is synchronised with respect to the others.

In each case, once the relative time of flight between the mobile device and a set of reference devices (beacon transmitters or anchor receivers, respectively) is known, then the location of the mobile device can be established. A method and apparatus according to an embodiment of the present invention can be useful in commissioning or maintaining the network or beacons or anchors, to help ensure that the correct timing synchronisation is maintained.

In some of the examples discussed above, GPS was used as an example of a GNSS system. Those skilled in the art will understand that embodiments of the invention can use other GNSS systems, including, but not limited to, Galileo and GLONASS.

In some of the examples discussed above separate antennas are used to receive signals of opportunity and GNSS signals, respectively. However, it is possible to use a single antenna for reception of both a signal of opportunity and GNSS signals.

In some of the examples discussed above, the signals of opportunity are transmitted by terrestrial transmitters. However, this is not essential. For example, a signal of opportunity could be transmitted by a geostationary satellite.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore in the appended claims lists comprising "at least one of: A; B; and C" should be interpreted as (A and/or B) and/or C.

Furthermore in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disk, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

The invention claimed is:

1. A method, for a movable device having a local clock, of determining a drift between the local clock and a reference clock that is used by one or more reference devices, by observing one or more signals transmitted by the respective one or more reference devices, the method comprising:
when the movable device is at a calibration location, receiving at the movable device, at a first time, a first portion of the signal transmitted by one of the reference devices;
moving the movable device to an operating location; and
when the movable device is at the operating location, receiving at the movable device, at a second time, a second portion of the signal transmitted by one of the reference devices, the first portion and the second portion having been transmitted with a time-interval between them, according to the reference clock;
the method further comprising:
determining the time-interval;
obtaining a model of the one or more signals, describing for each signal at least one of:
a direction of propagation of that signal, and
the location of the respective reference device;
determining local time information comprising: the first time and the second time, or a time difference between them, according to the local clock;
defining position variables comprising:
the calibration location and the operating location, or
a displacement vector between them;
constructing a set of one or more equations, which relates the position variables, the model, the local time information, the time-interval, and the drift;
solving the set of one or more equations, to determine the drift; and
correcting the clock of the movable device based on the determined drift.

2. The method of claim 1, wherein the first portion and the second portion are different portions of the signal transmitted by one reference device.

3. The method of claim 1, wherein:
the first portion and the second portion are transmitted by different reference devices;
the model comprises the location of each of the reference devices; and
the calibration location is known.

4. The method of any of claim 1, wherein each of the one or more reference devices is stationary.

5. The method of claim 1, further comprising:
when the movable device is at the calibration location, determining the first time according to the reference clock; and
when the movable device is at the operating location, determining the current time according to the reference clock, based on:
the first time according to the reference clock;
the first time according to the local clock;
the current time according to the local clock; and
the drift.

6. The method of claim 5, wherein:
the reference clock is synchronised with a clock of a satellite positioning system;
the movable device comprises a satellite positioning receiver for use with the satellite positioning system; and
the step of determining the first time according to the reference clock comprises determining, using the satellite positioning receiver, the first time according to the clock of the satellite positioning system.

7. The method of claim 1, wherein the movable device comprises a satellite positioning receiver for determining, using a satellite positioning system, the position of the movable device,
and the method further comprises determining the calibration location using the satellite positioning receiver.

8. The method of claim 1, further comprising determining the operating location based on the signals transmitted by the one or more reference devices.

9. The method of claim 1, wherein three stationary reference devices are synchronised with the reference clock and the method comprises:
  when the movable device is at the calibration location, receiving, from each of the three reference devices, at respective first times, a first portion of the signal transmitted by that reference device;
  when the movable device is at the operating location, receiving, from each of the three reference devices, at respective second times, a second portion of the signal transmitted by that reference device, each first portion and second portion having been transmitted by the respective reference device with a respective predetermined time-interval between them, according to the reference clock;
  wherein the local time information comprises: the first times and the second times, or respective time differences between them, according to the local clock.

10. The method of claim 1 wherein the step of solving the set of equations to determine the drift is assisted by satellite positioning signals received by the movable device at the operating location.

11. The method of claim 1, wherein the model comprises the direction of propagation of each of the one or more signals and the direction of propagation of at least one signal is different from the straight-line direction to the respective reference device from which the signal was transmitted.

12. The method of claim 2, wherein each of the one or more reference devices is stationary.

13. The method of claim 3, wherein each of the one or more reference devices is stationary.

14. A non-transitory computer-readable medium containing a computer program comprising computer program code adapted to control a physical computing device to perform all the steps of a method of determining a drift between a local clock and a reference clock, if said program is run on the physical computing device,
  wherein the local clock is a clock of a movable device,
  the reference clock is used by one or more reference devices, and the method comprises observing, at the movable device, one or more signals transmitted by the respective one or more reference devices,
  the method comprising:
  when the movable device is at a calibration location, receiving at the movable device, at a first time, a first portion of the signal transmitted by one of the reference devices;
  moving the movable device to an operating location; and
  when the movable device is at the operating location, receiving at the movable device, at a second time, a second portion of the signal transmitted by one of the reference devices, the first portion and the second portion having been transmitted with a time-interval between them, according to the reference clock;
  the method further comprising:
  determining the time-interval;
  obtaining a model of the one or more signals, describing for each signal at least one of:
    a direction of propagation of that signal, and
    the location of the respective reference device;
  determining local time information comprising: the first time and the second time, or a time difference between them, according to the local clock;
  defining position variables comprising:
    the calibration location and the operating location, or a displacement vector between them;
  constructing a set of one or more equations, which relates the position variables, the model, the local time information, the time-interval, and the drift;
  solving the set of one or more equations, to determine the drift; and
  correcting the local clock of the movable device based on the determined drift.

15. A movable device comprising:
  a local clock (1225);
  a receiver (1210), adapted to receive one or more signals transmitted by respective one or more reference devices, wherein the reference devices use a reference clock; and
  a processor (1220), adapted to determine a drift between the local clock and the reference clock,
  wherein the receiver (1210) is adapted to:
    receive, at a calibration location (P) at a first time, a first portion of the signal transmitted by one of the reference devices; and
    receive, at an operating location (Q) at a second time, a second portion of the signal transmitted by one of the reference devices, the first portion and the second portion having been transmitted with a time-interval between them, said time-interval being defined according to the reference clock,
  and wherein the processor (1220) is adapted to:
    determine the time-interval;
    obtain a model of the one or more signals, describing for each signal at least one of: a direction of propagation of that signal, and the location of the respective reference device;
    determine local time information comprising: the first time and the second time, or a time difference between them, according to the local clock;
    define position variables comprising: the calibration location and the operating location, or a displacement vector between them;
    construct a set of one or more equations, which relates the position variables, the model, the local time information, the time-interval, and the drift;
    solving the set of one or more equations, to determine the drift; and
    correct the local clock of the movable device based on the determined drift.

16. The device of claim 15, wherein the device comprises at least one of:
  a cellular base station, preferably an indoor cellular base station;
  a wireless-network access point;
  one of a set of wireless reference beacons, each of which is adapted to transmit a beacon signal with a predetermined timing relationship to the other beacons, for a remote device receiving the beacon signals to calculate its position by trilateration; and
  one of a set of wireless reference receivers, each of which is adapted to receive a signal from a remote device and determine the time or arrival of the signal, for calculating the position of that remote device by trilateration.

17. The device of claim 15, wherein the one or more reference devices include at least one of:
  a cellular base station;
  a wireless-network access point;
  one of a synchronised set of wireless reference beacons;
  one of a synchronised set of wireless reference receivers;
  a terrestrial digital television or digital audio broadcast transmitter; and
  a geostationary communications satellite.

\* \* \* \* \*